US010060555B2

(12) United States Patent
Lønnemo et al.

(10) Patent No.: US 10,060,555 B2
(45) Date of Patent: Aug. 28, 2018

(54) LOAD TRANSFERRING SUBSEA STRUCTURE (75) Inventors: Ulf Lønnemo, Rasia (NO); Terje Pedersen, Nesøya (NO); Rolf Nerem, Vollen (NO); Per Lillejordet, Bjørnemyr (NO); John Anders Ingebo, Krokkleiva (NO)

(73) Assignee: Apply Nemo AS, Lysaker (NO)

( * ) Notice: Subject to any disclaimer, the term of this patent is extended or adjusted under 35 U.S.C. 154(b) by 922 days.

(21) Appl. No.: 13/394,452

(22) PCT Filed: Sep. 15, 2010

(86) PCT No.: PCT/NO2010/000338
§ 371 (c)(1),
(2), (4) Date: Mar. 6, 2012

(87) PCT Pub. No.: WO2011/034438
PCT Pub. Date: Mar. 24, 2011

(65) Prior Publication Data
US 2012/0160505 A1 Jun. 28, 2012

(30) Foreign Application Priority Data
Sep. 16, 2009 (NO) .................................. 20093011

(51) Int. Cl.
*E21B 43/013* (2006.01)
*F16L 1/26* (2006.01)
(52) U.S. Cl.
CPC ...................................... *F16L 1/26* (2013.01)
(58) Field of Classification Search
CPC .................................. E21B 43/013; F16L 1/26
(Continued)

(56) References Cited

U.S. PATENT DOCUMENTS 3,308,881 A * 3/1967 Chan .................... E21B 43/0135
166/339
3,338,596 A * 8/1967 Knox .................... E21B 33/038
285/110
(Continued)

FOREIGN PATENT DOCUMENTS

WO WO-03050443 A1 6/2003
WO WO-2006005994 A1 1/2006

OTHER PUBLICATIONS

Lindkvist, Bjorn, "International Search Report" for PCT/NO2010/000338, dated Nov. 26, 2010, 5 pages.

*Primary Examiner* — Matthew R Buck
*Assistant Examiner* — Edwin J Toledo-Duran
(74) *Attorney, Agent, or Firm* — Winstead PC (57) ABSTRACT

A load transferring subsea structure (10) for temporary guiding and permanently relieve forces within a pipe connection that is subjected to bending moments when connection is completed. A connector (3) keeps the pipe ends ($E_1$, $E_2$) together. The load transferring structure (10) includes one basically stationary structure (1) that retains a first pipe end ($E_1$) and one basically manoeuvrable structure (2) that retains the second pipe end ($E_2$). The second pipe end ($E_2$) is to be connected to the first, stationary pipe end ($E_1$). The stationary structure (1) includes portions (6) having predetermined configuration including fitted surfaces (6a, 6b) for interaction during mating with complementary portions (11, 12) having predetermined configuration including fitted surfaces (14, 15) on the mobile structure (2) for creation of a load path external of the pipe ends ($E_1$, $E_2$).

13 Claims, 6 Drawing Sheets (58) Field of Classification Search
USPC .......... 166/341, 345, 379, 380; 285/114
See application file for complete search history.

(56) References Cited

U.S. PATENT DOCUMENTS

| | | | | |
|---|---|---|---|---|
| 3,347,567 A * | 10/1967 | Watkins | ............... | E21B 33/038 166/341 |
| 3,459,442 A * | 8/1969 | Johnson | ............... | E21B 43/0107 166/343 |
| 3,492,027 A * | 1/1970 | Herring | ............... | E21B 33/038 166/340 |
| 3,500,906 A * | 3/1970 | Petersen | ............... | E21B 33/038 166/341 |
| 3,592,014 A * | 7/1971 | Brown | ............... | E21B 43/0135 166/343 |
| 3,605,415 A * | 9/1971 | Mohlman | ............... | E21B 17/01 114/264 |
| 3,618,661 A * | 11/1971 | Peterman | ............... | E21B 41/10 166/343 |
| 3,626,701 A * | 12/1971 | Laffont | ............... | B63B 35/4406 114/264 |
| 3,675,713 A * | 7/1972 | Watkins | ............... | E21B 17/01 166/340 |
| 3,710,580 A * | 1/1973 | Mott | ............... | B63B 21/502 405/202 |
| 3,732,923 A * | 5/1973 | Fowler | ............... | E21B 43/013 166/339 |
| 4,019,334 A * | 4/1977 | Sinclair | ............... | E21B 43/0107 285/18 |
| 4,036,295 A * | 7/1977 | Kirkland | ............... | E21B 43/013 166/342 |
| 4,109,480 A * | 8/1978 | Sumner | ............... | B66F 19/00 182/2.8 |
| 4,114,393 A * | 9/1978 | Engle, Jr. | ............... | B63B 21/502 114/264 |
| 4,139,221 A * | 2/1979 | Shotbolt | ............... | B23Q 1/0027 285/18 |
| 4,153,278 A * | 5/1979 | Ahlstone | ............... | F16L 27/06 285/146.3 |
| 4,200,312 A * | 4/1980 | Watkins | ............... | E21B 33/038 137/798 |
| 4,310,263 A * | 1/1982 | Daughtry | ............... | F16L 1/26 166/341 |
| 4,360,290 A * | 11/1982 | Ward | ............... | E21B 43/0107 138/89 |
| 4,365,912 A * | 12/1982 | Burns | ............... | E21B 43/0122 405/224 |
| 4,437,521 A * | 3/1984 | Richardson | ............... | E21B 41/06 166/341 |
| 4,439,068 A * | 3/1984 | Pokladnik | ............... | E21B 41/10 166/338 |
| 4,459,065 A * | 7/1984 | Morton | ............... | E21B 43/0135 166/343 |
| 4,525,101 A * | 6/1985 | Stevens | ............... | F16L 1/26 405/169 |
| 4,687,062 A * | 8/1987 | Beghetto | ............... | E21B 41/08 166/366 |
| 4,735,267 A * | 4/1988 | Stevens | ............... | B63B 22/021 166/345 |
| 4,784,523 A * | 11/1988 | Louis | ............... | E21B 41/10 166/343 |
| 4,808,034 A * | 2/1989 | Birch | ............... | B63B 27/24 166/367 |
| 4,895,481 A * | 1/1990 | Pepin-Lehalleur | ............... | B63B 35/4413 405/195.1 |
| 5,051,036 A * | 9/1991 | Gomez De Rosas | ............... | E02B 17/027 405/195.1 |
| 5,244,312 A * | 9/1993 | Wybro | ............... | E02B 17/00 166/338 |
| 5,265,980 A * | 11/1993 | Lugo | ............... | E21B 33/0355 166/347 |
| 5,299,641 A * | 4/1994 | Paulo | ............... | E21B 33/035 166/341 |
| 5,310,006 A * | 5/1994 | Freitas | ............... | E21B 33/0355 166/339 |
| 5,333,691 A * | 8/1994 | Dean | ............... | E21B 41/04 166/341 |
| 5,609,441 A * | 3/1997 | Khachaturian | ............... | B63B 9/065 405/204 |
| 5,771,974 A * | 6/1998 | Stewart | ............... | E21B 34/045 166/322 |
| 5,819,852 A * | 10/1998 | Cunningham | ............... | E21B 17/01 166/345 |
| 5,975,803 A * | 11/1999 | Mackinnon | ............... | E21B 43/0135 166/343 |
| 6,102,124 A * | 8/2000 | Skeels | ............... | E21B 33/0355 166/347 |
| 6,109,830 A * | 8/2000 | de Baan | ............... | E21B 43/01 166/341 |
| 6,253,855 B1 * | 7/2001 | Johal | ............... | E21B 17/01 166/345 |
| 6,290,431 B1 * | 9/2001 | Exley | ............... | F16L 1/26 137/317 |
| 6,343,893 B1 * | 2/2002 | Gleditsch | ............... | E21B 19/002 114/264 |
| 6,361,250 B1 * | 3/2002 | de Varax | ............... | F16L 1/19 405/158 |
| 6,364,574 B1 * | 4/2002 | Khachaturian | ............... | B63B 9/065 114/51 |
| 6,375,391 B1 * | 4/2002 | Børseth | ............... | E21B 19/004 114/264 |
| 6,481,504 B1 * | 11/2002 | Gatherar | ............... | E21B 43/013 166/344 |
| 6,484,806 B2 * | 11/2002 | Childers | ............... | E21B 33/0355 166/351 |
| 6,554,324 B1 * | 4/2003 | Herman | ............... | E21B 33/038 285/123.11 |
| 6,557,637 B1 * | 5/2003 | Dore | ............... | E21B 17/01 166/338 |
| 6,644,410 B1 * | 11/2003 | Lindsey-Curran | ............... | E21B 33/0355 166/338 |
| 6,817,808 B1 * | 11/2004 | Patinet | ............... | F16L 3/1075 166/341 |
| 7,086,807 B2 * | 8/2006 | Mackinnon | ............... | E21B 41/04 166/347 |
| 7,216,714 B2 * | 5/2007 | Reynolds | ............... | E21B 33/035 137/557 |
| 7,467,662 B2 * | 12/2008 | Smith | ............... | E21B 33/0385 166/343 |
| 7,503,391 B2 * | 3/2009 | McCanna | ............... | E21B 17/01 166/343 |
| 7,503,727 B2 * | 3/2009 | Ingebretsen | ............... | F16L 1/26 405/169 |
| 2005/0063786 A1 * | 3/2005 | Trepka | ............... | F16L 1/26 405/183.5 |
| 2005/0196243 A1 * | 9/2005 | Pollock | ............... | E21B 17/085 405/224.3 |
| 2006/0067792 A1 * | 3/2006 | Joshi | ............... | F16L 1/163 405/171 |
| 2007/0009328 A1 * | 1/2007 | Bastesen | ............... | E21B 43/0107 405/169 |
| 2007/0081862 A1 * | 4/2007 | Wolbers | ............... | E21B 17/012 405/169 |
| 2007/0269270 A1 * | 11/2007 | Bastesen | ............... | F16L 1/20 405/170 |
| 2008/0253842 A1 * | 10/2008 | Wolbers | ............... | B63B 27/24 405/169 |

* cited by examiner

LOAD TRANSFERRING SUBSEA STRUCTURE

The present invention relates to a load transferring subsea structure for temporary guiding and permanently relieve forces within a pipe connection that is subjected to bending moments, when connection is completed by a connector that keeps the pipe ends together, which load transferring structure includes one basically stationary structure that retains the first pipe end and one basically manoeuvrable structure that retains the second pipe end, which second pipe end is to be connected to the first, stationary pipe end.

Such a load transferring subsea structure is part of a connection system for pipes on the seabed. The load transferring subsea structure can be considered as a permanent tool that is used during remote controlled connection and disconnection of horizontally extending pipes and pipeline bundles located on the seabed. Connecting rigid to rigid pipes and flexible to rigid pipes are performed by use of the load transferring subsea structure.

In order to deploy, install and operate the load transferring subsea structure, a working vessel having position and motion compensated systems is used on the surface The load transferring subsea structure includes equipments that constitute permanent components in the complete interconnected system. Equipment used during the connection and disconnection, are tools that are not part of the finished interconnected system. Tools, mechanically or hydraulically activated, that are used during the interconnection, are operated by remotely controlled and operated subsea vessels (ROV).

One main idea behind the present invention is that by the load transferring subsea structure a predetermined share of loads are routed past ("bypass") the connection itself and further into underlying structures. The loads are controlled by means of tolerances. Thus connectors of low capacity can be used even at large bending moments from external piping. The load transferring subsea structure is so rigid that the structure can handle and control external pipe hubs, or porches, within the guide-in tolerances of the actual connectors.

As far as we know, this has never been done before, just because any contact between an internal structure and an external structure when the connection is made up, shall normally not exist. This means that all loads traditionally have been transmitted through the joint connection and mainly into the internal piping. By the present load transferring subsea structure the internal piping and the connections or joints can be relieved.

In this description the word "stationary" is used about a structure which is stationary relative to a mobile or operable structure, but necessarily not relative to the ground or the seabed.

Based on the above stated, and according to the present invention, a load transferring subsea structure of the introductory said kind is provided, which is distinguished in that the stationary structure includes portions having predetermined configuration including fitted surfaces for interaction during mating with complementary portions having predetermined configuration including fitted surfaces on the mobile structure for creation of a load path external of the pipe ends, which portions with fitted surfaces are processed to controllable tolerances that provide moment transferring means during possible loads or strain within said pipe ends.

In one embodiment of the invention the stationary structure includes a back plate that defines a plate plane that retains the first pipe end in the form of a projecting pipe hub, two projecting guide structures extending substantially perpendicular on the plane of the back plate and extends in the same direction as the projecting pipe hub, a connecting plate that extends substantially in parallel with the back plate and spaced apart therefrom and interconnects the two guide structures.

In one preferable version the manoeuvrable structure includes a front plate part and a rear plate part that together retains the second pipe end, which plate parts extend substantially in parallel and spaced apart from each other and are interconnected by two bracing structures, and further includes guide portions to cooperate with said guide structures of the stationary structure.

Suitably the guide portions of the manoeuvrable structure and the guide structures of the stationary structure include said portions having predetermined configuration with controllable tolerances that provide the moment transferring means that come into action during loading of said pipe ends.

Further, the said portions having predetermined configuration with fitted surfaces for each guide structure of the stationary structure can include a front portion in the form of a projecting pin extending from the interconnecting plate, and a rear portion in the form of a processed or machined portion.

Moreover the said portions having predetermined configuration with fitted surfaces for each guide portion of the mobile structure can include a front portion in the form of a substantially horseshoe formed cut out in the front plate part, and a rear portion in the form of a projecting pipe hub extending from the rear plate part.

Preferably the projecting hub, during mating and subsequent to connection, cooperates with the projecting pipe hub and the machined portion cooperates with the substantially horseshoe formed cut out, said portions being made with tolerances relative to each other which provide the moment transferring means that come into action during loading of said pipe ends.

Preferably each guide structure of the stationary structure includes an intermediate portion having incisions located somewhere between the projecting pin and the machined portion, which incision eases the access for the horseshoe formed cut out in the front plate part during landing on the guide structure, and connects these to each other during advancement of the mobile structure towards the stationary structure.

Further the load transferring subsea structure can include a catch/guide tool for temporary attachment to the stationary structure for assistance during the connecting operation.

In one suitable embodiment of the load transferring subsea structure the manoeuvrable structure may include swivel means that allows rotation of the pipeline relative to the manoeuvrable structure about the longitudinal axis of the pipeline. This feature shall enable relieve of any torsional stresses that could be present in the pipeline.

Other and further objects, features and advantages will appear from the following description of preferred embodiments of the invention, which is given for the purpose of description, and given in context with the appended drawings where:

Figures 1A, 1B:
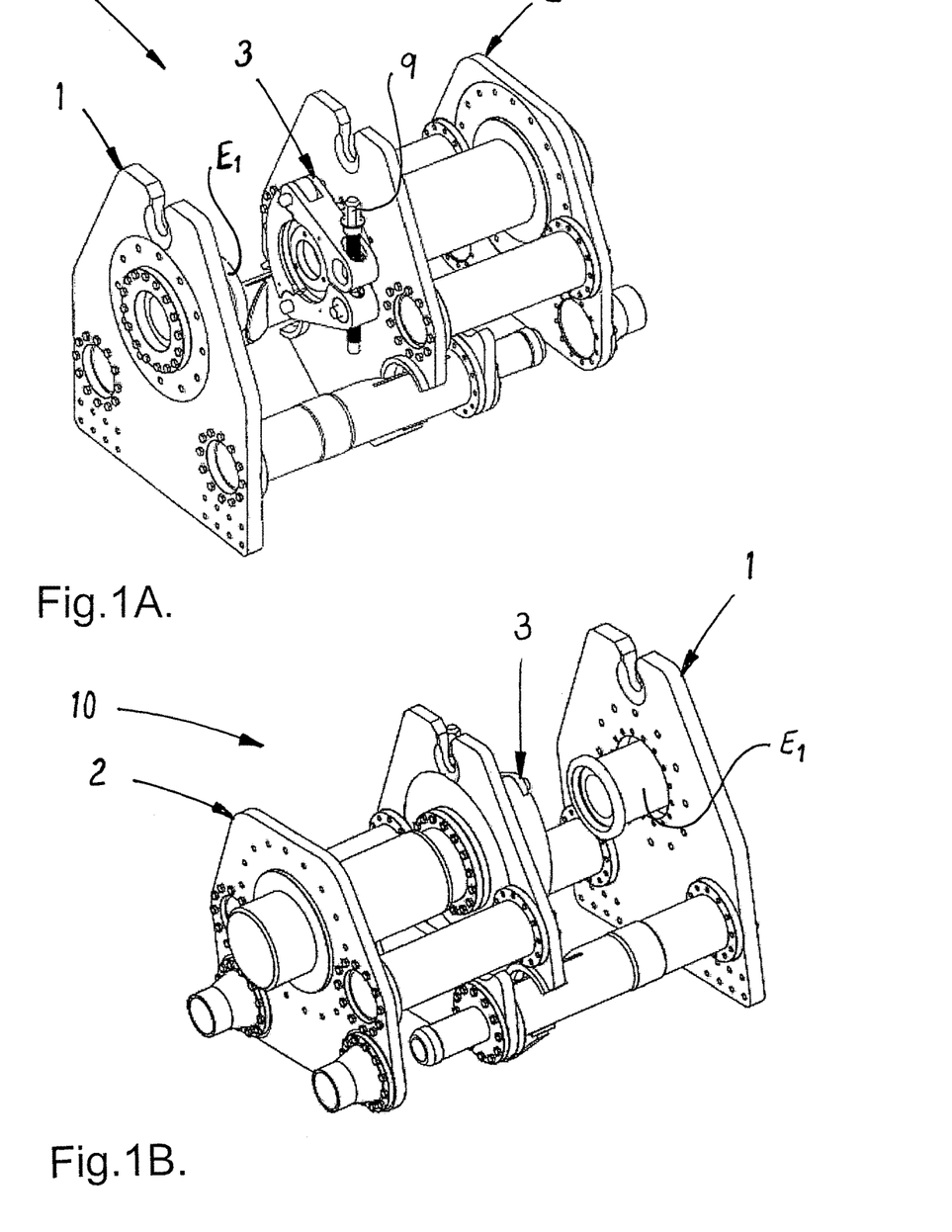
FIG. 1A shows in perspective view the load transferring subsea structure according to the present invention.
FIG. 1B shows in perspective view the load transferring subsea structure according to the invention seen from opposite side of that shown in FIG. 1A.

FIGS. 1A and 1B show the load transferring subsea structure 10 which is designed for temporary guiding and permanent relive of forces within a pipe joint or pipe connection. The load transferring subsea structure 10 is assembled by two main parts, a stationary structure 1 that is designed to retain a pipe end $E_1$, and a mobile or manoeuvrable structure 2 that is designed to retain a second pipe end $E_2$. The pipe ends $E_1$, $E_2$ are in turn to be interconnected by means of a clamp connector 3 for long lasting leakage free connection between the pipe ends $E_1$, $E_2$ on the seabed.

Figure 2:
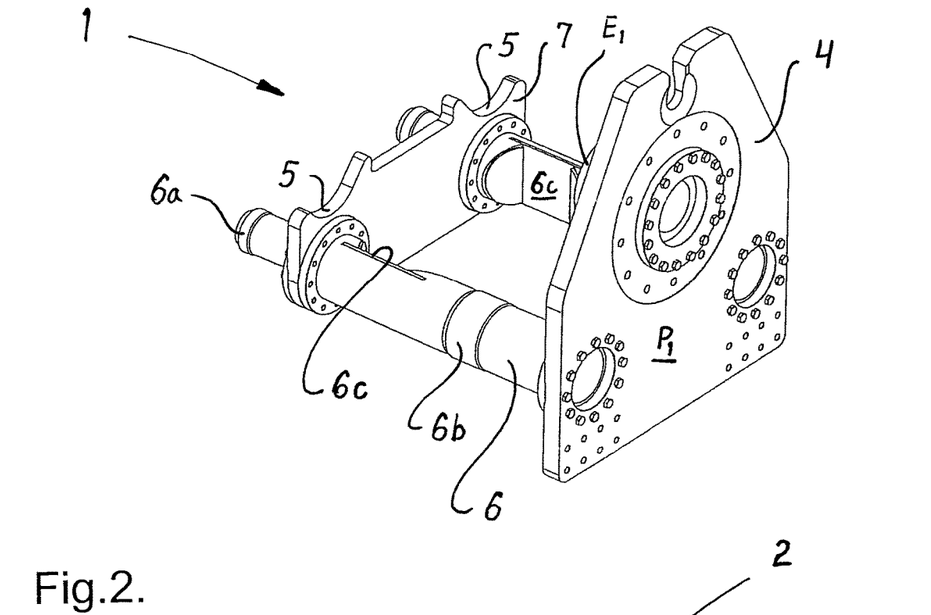
FIG. 2 shows in perspective view the stationary structure of load transferring subsea structure according to the invention.

FIG. 2 shows the stationary structure 1 isolated from the mobile structure 2. The stationary structure 1 includes a back plate 4 that defines a plate plane $P_1$. The back plate 4 retains the one or first pipe end $E_1$ and appears as a projecting pipe hub terminating in a flange. Two guide structures 6 are fixed to the back plate 4 and extend substantially perpendicular to the plane $P_1$ of the back plate 4 and in the same direction as the projecting pipe hub. A connecting plate 7 is in turn secured to the guide structures 6 and extends substantially in parallel with the back plate 4, but at a predetermined distance apart from the back plate 4. The plate 7 interconnects the two guide structures 6. The stationary structure 1 has means that constitute contact/landing/positioning/guiding and force transferring areas against the manoeuvrable structure 2. More precisely, such means can be pipe subs having the portions 6a and the annular portions 6b on the guide structures 6. These are in turn included by the said portions of predetermined configuration with controllable tolerances providing the moment transferring means coming into action during loadings of the pipe ends.

Figure 3:
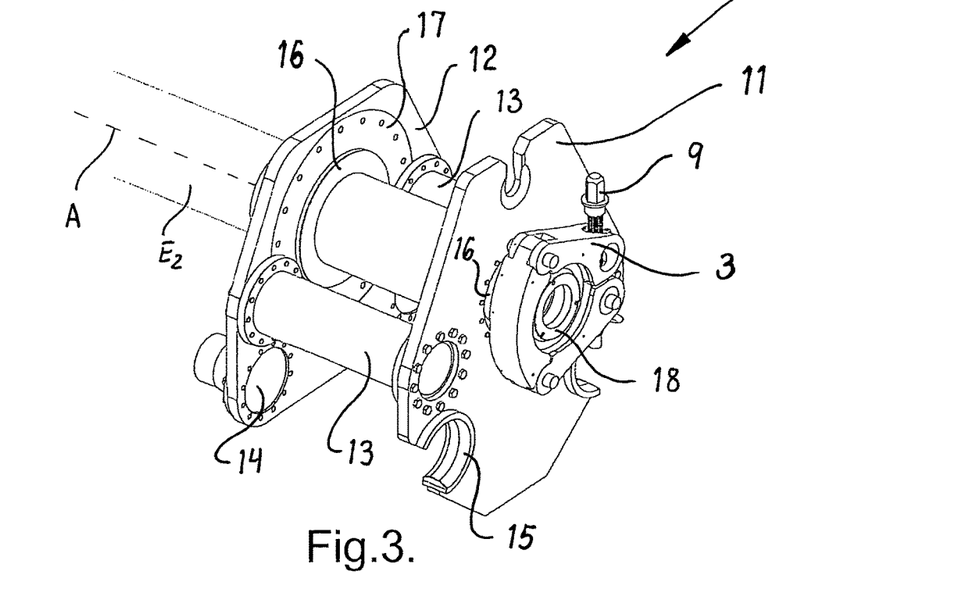
FIG. 3 shows in perspective view the mobile structure of load transferring subsea structure according to the invention.

FIG. 3 shows the manoeuvrable structure 2 isolated from the stationary structure 1. The manoeuvrable structure 2 includes a front plate part 11 and a rear plate part 12 which together retain the second pipe end $E_2$. The two plate parts 11, 12 extend substantially in parallel and in predetermined distance apart from each other. The two plate parts 11, 12 are interconnected by to bracing structures 13 that is fixedly secured to the plate parts 11, 12. In addition, the mobile structure 2 has guide means 14, 15 for cooperation with the above said guide structures 6 having the portions 6a, 6b of the stationary structure 1.

The manoeuvrable structure 2 is connected to the end $E_2$ of the pipeline by means of a swivel 16. The swivel 16 allows rotation of the pipeline relative to manoeuvrable structure 2 about the longitudinal axis A of the pipeline. This connection between manoeuvrable structure 2 and the pipeline is made up by means of a non rotatable bolt flange 17 when this constitutes a pipe bundle or cable. The pipeline terminates in a flange or connecting profile 18 which is complementary to a corresponding surface of the mechanical clamp connector 3. The clamp connector 3 is able to transform radially tightened forces to axially acting forces. Such clamp connectors 3 are commonly known per se and will not be described in detail here. In this case, the clamp connector 3 is fixed to that structure (here 2), which is easiest accessible to retrieve from the seabed.

The manoeuvrable structure 2 has means that constitute contact/landing/positioning/guiding and force transferring areas against the stationary structure 1. More precisely the guiding means constitute one substantially horseshoe formed cut out 15 in the front plate part 11, and a projecting pipe sub 14 extending from the rear plate part 12. These are in turn included by the said portions having predetermined configuration with controllable tolerances providing the moment transferring means coming into action during loadings of the pipe ends.

By studying FIGS. 2 and 3, it is to be understood that the projecting pin having the portion 6a, is to cooperate with, or engage, the internal wall of the projecting pipe sub 14 during the mating operation and after completed make up of the pipe ends $E_1$, $E_2$. The machined portion 6b is to cooperate with, or engage, the horseshoe formed cut out 15. These parts are processed with tolerances relative to each other which provide the moment transferring means coming into action during loadings of the pipe ends.

It is further to be observed that each guide structure 6 of the stationary structure 1 has an intermediate part with notches or incisions 6c located somewhere between the projecting portion 6a and the machined portion 6b. These notches 6c enable the access for the horseshoe formed cut out 15 in the front plate part 11 during landing on the guide structure 6. During subsequent advancement of the mobile structure 2 towards the stationary structure 1, this connects the structures 1, 2 to each other.

Figures 4A, 4B, 4C:
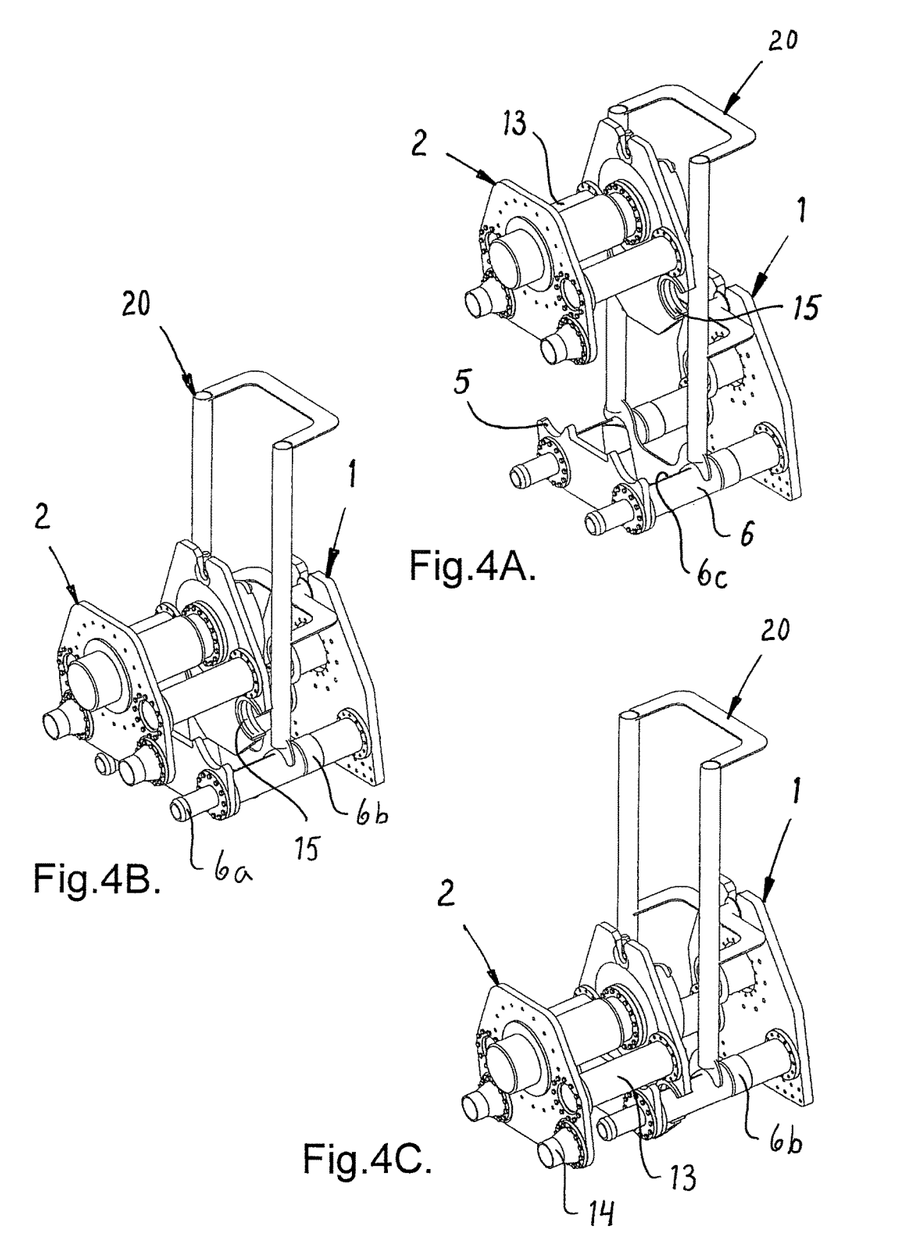
FIG. 4A-4C show in perspective views sequences of a lowering operation of the mobile structure towards the stationary structure by use of a tool.

With reference to FIGS. 4A to 4C, there is shown that a catch/guiding tool 20 to be installed temporary to the stationary structure 1, can be used. A procedure of how to install the equipment will now be described together with the figures.

The stationary structure 1 is connected to the subsea equipment which is initially installed. This can be a template on a larger structural unit, a pipeline end or a pipeline branch. The pipe of the subsea installation terminates in a flange having a connection profile bolted onto the structure 1. As before, this connection profile is complementary to a corresponding surface of the mechanical clamp connector 3. The stationary structure 1 is secured to the frame of the subsea installation as a cantilevered unit. Such takes place through the main plate 4 together with the connected pipe $E_1$. In addition the pipe can be secured at the end of the cantilevered unit to an outer plate dependent on functional requirements to force and moment transfer.

The sequence of installation and the relative connecting motion of the structures 1 and 2 are adapted to the operation and entire installation. The structures 1, 2 are guided towards each other by relative movements. If the movements are large, a catch/guiding tool 20 can be installed to cushion and stabilize, possibly guide the movements.

The manoeuvrable structure 2 is landed onto the stationary structure 1 in that the front main plate 11 of the manoeuvrable structure 2 is inclined and is guided towards the notches 6c of the rounded guide structures 6 of the structure 2. The horseshoe formed and downwardly facing pockets or cut outs 15 of the main plate 11, nest onto the rounded profiles of the guide structures 6. This takes place at the same time as the rounded profiles of the bracing structures 13 of the manoeuvrable structure 2 is guided towards circular and upwardly facing pockets or saddles 5 in the front interconnecting plate 7 of the stationary structure 1. In this position the structures 1, 2 can be secured against axial relative motion.

Figures 5, 6, 7:
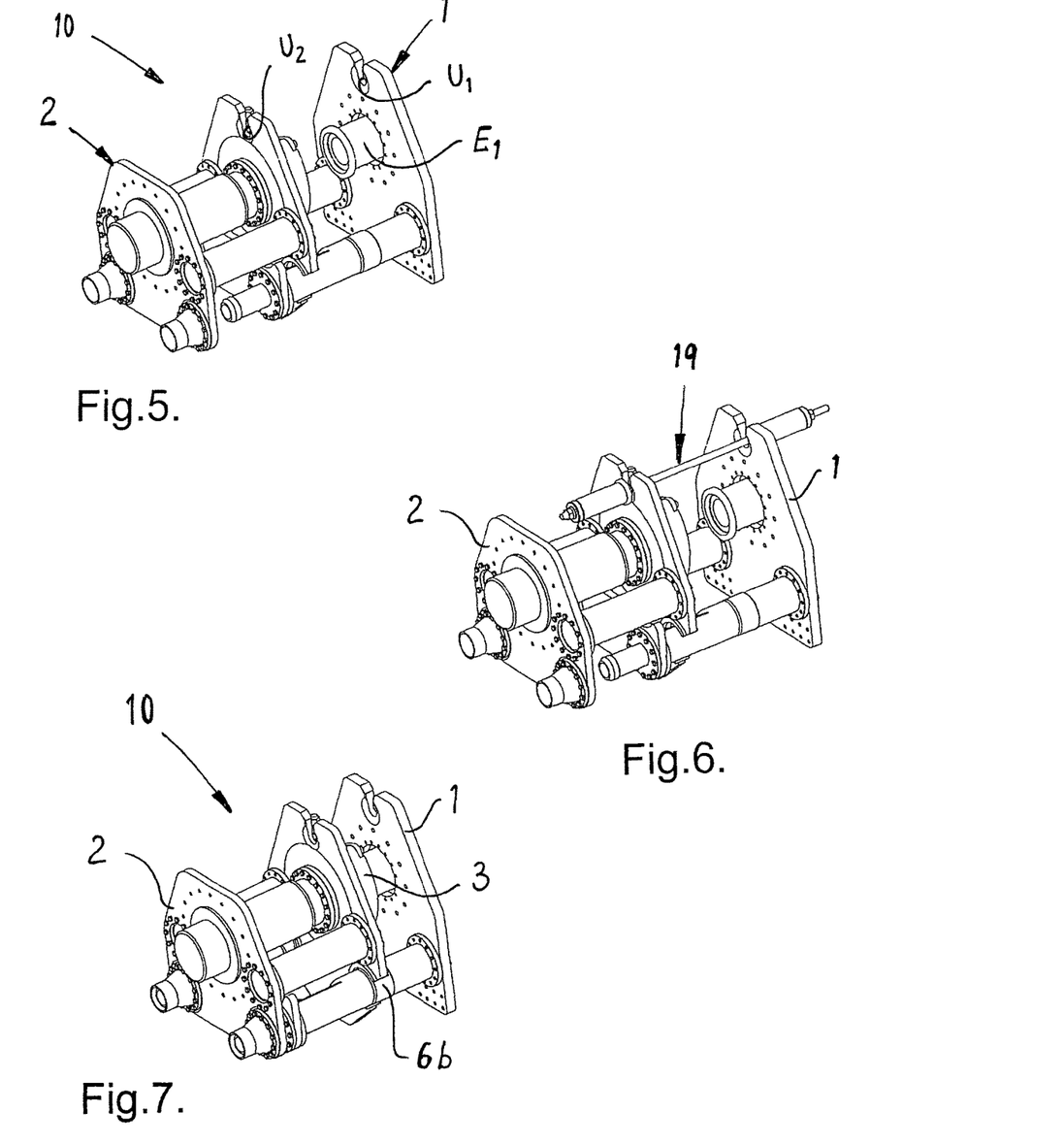
FIG. 5 shows in perspective view the same as FIG. 4A subsequent to removal of the tool.
FIG. 6 shows in perspective view a pull/push tool secured to the subsea structure.
FIG. 7 shows in perspective view the load transferring subsea structure in a connected state.

The catch/guiding tool 20 is then removed, as shown on FIG. 5, in order to perform further operations to connect the pipelines. Further operations for connection will in general be inspection with possible subsequent cleaning of gasket surfaces of the clamp connector 3. FIG. 5 actually shows the same situation as FIGS. 1B and 4C without the tool 20.

As illustrated in FIG. 6, a hydraulic/mechanical tie-in tool 19 can be placed between the mobile and stationary structure 1, 2. It is shown a recess $U_1$ in the back plate 4 of the stationary structure 1 and a recess $U_2$ in the main plate 11 of the manoeuvrable structure 2. This tool 19 can be activated in order to pull the mobile structure 2 towards and into engagement with the stationary structure 1. The cooperating means of the structures 1, 2 will now slide relative each other. Such means will together be capable to take up moments about all three axes. During the axial movement, the structures 1, 2 are guided in against each other to align the pipe ends $E_1$, $E_2$ so that the flanges and the connecting profiles of the clamp connector 3 are engaged or in mesh. The guiding in has sufficient capacity to correct installation tolerances such that the clamp connector can be activated and closed according to set requirements. The tightening of the clamp connector 3 can take place by means of a ROV which makes up the tightening bolt 9 as shown on FIG. 1A. The load transferring subsea structure 10 has capacity and tolerances to lead forces/moments external of the clamp connector 3 in order to relieve the connector.

During pull-in, the guide portions 6a, 6b of the structure 1 and the means 14, 15 of the structure 2 will cooperate and the rounded brace profiles 13 of the structure 1 lift clear off the arched pockets or saddles 5 in the plate 7 of the structure 1.

In the final part of the movement, the tightening of the clamp connector 3 will provide clearance between the downwardly facing horseshoe formed cut outs 15 in the front plate 11 of the structure 2 and the rounded portions 6b of the structure 1. The clamp connector 3 will as mentioned finish the last part of the connecting operation by use of separate actuation tool which operate the bolt 9.

If the loads are low after the connection is made up, clearance will exist all places between the structures 1 and 2. If the loads are large, contact will exist between the structures 1 and 2 and part of the loads pass directly from structure 1 via the guide means through the rounded profiles in the structure 2 and into the main plate 4 and out into the installation structure. The load transfer then will primarily take place via the projecting pipe subs having guiding means 14 and the guide structures 6, i.e. that the guide portions 6a touch within the guide means 14. In principle, it is not desired (statically undetermined system) that the horseshoe cut outs 15 shall touch the guide structures 6, i.e. the portions 6b, when the connection is made up.

How much of the loads that pass through the load carrying structure along this route, is dependent of the tolerances one has decided for. This can be adapted to the capacity of the clamp connector 3 such that this load path can relieve the connector 3. This in contrast to the traditional systems where the clamp connector is to take all loads and lead the loads through the pipe system. The pipe system may include components that are sensible to such forces, for example valves.

What is characteristic for the load transferring subsea structure 10, is the distribution of the loads before and after the connection is made up with the clamp connector 3. The load transferring subsea structure 10 can take care of loads/moments in order to relieve the clamp connector 3 by a predetermined force/moment distribution ratio.

The result is a more safe connection with less risk for leakages in the clamp connector 3, which otherwise would have used all capacity to other purposes than making a tight and safe connection.

It is further to be understood that the tolerances discussed here between the guide portions are in order of magnitude a few tenths of millimetres.

Figure 8:
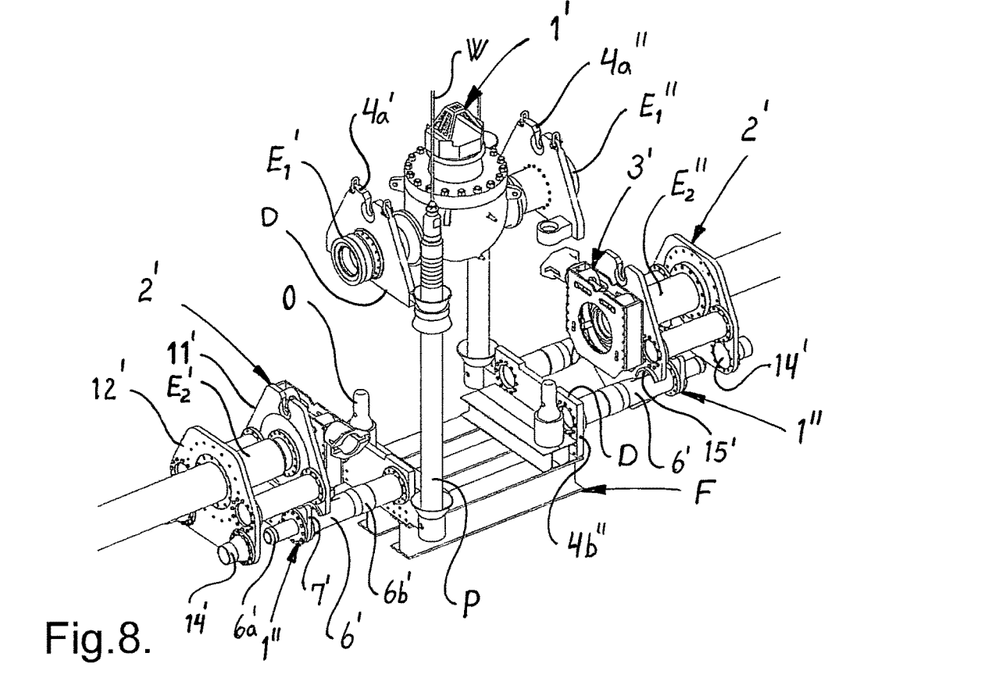
FIG. 8 shows in perspective view one embodiment where the originally stationary structure now is in the form of a retrievable/replaceable unit that is designed for assembly between two manoeuvrable structures.

With reference to FIG. 8, one particular embodiment of the load transferring subsea structure 10 is shown, where the originally stationary structure 1 now is replaced by a retrievable/replaceable module 1' and two stationary, cooperating subsea units 1". This module 1' can for example include a valve. In the shown embodiment the module 1' can be lowered or retrieved along guide wires W and be landed and guided in place by use of guide posts P which in turn extend from a subsea base frame structure F.

As shown on the figures this module 1' is designed for installation between two manoeuvrable structures 2' of the nature already described above in connection with FIGS. 1-7. The retrievable/replaceable module l' only has a few of the originally constructional features as the unit 1 has. The retrievable/replaceable module 1' includes two oppositely facing pipe ends $E_1'$, $E_1''$. The subsea unit 1" is equipped with two projecting guide structures 6' having respective portions with predetermined configuration and with fitted surfaces 6a', 6b' for interaction, during mating, with complementary portions 11', 12' having predetermined configuration with fitted surfaces 14', 15' on each individual mobile structure 2'. As before, these structures form a load path external of the pipe ends $E_1'$, $E_2'$; $E_1''$, $E_2''$ when the pipes are subjected to bending moments. As before, the portions 14', 15' with fitted surfaces are processed or machined to controllable tolerances that provide moment transferring means during possible loadings or strain within said pipe ends $E_1'$, $E_2'$; $E_1''$, $E_2''$.

Moreover, it is to be noted that the part corresponding to the back plate 4 of the previous embodiments, is divided into two back plate parts 4a' and 4b' along a substantially horizontal partition line D. In addition guiding means O of suitable nature are arranged in order to align the plate parts 4a', 4b' relative to each other. The upper part of the back plate 4a' follows the module to the surface, while the lower back plate part 4b' remains on the seabed together with the projecting guide structures 6'.

The respective back plate parts 4a', 4b' retain its respective pipe end $E_1'$, $E_2'$ which appear as projecting pipe subs. As shown in FIG. 8, each back plate is parted in an upper back plate 4a', 4a" of the module 1' and a lower, aligned back plate 4b', 4b" arranged on each subsea unit 1" and which together form said plate plane $P_1$ when they are mated via the guiding means O.

As before, the respective portions of each subsea unit 1" are in the form of projecting guide structures 6' erected substantially perpendicular to the back plate 4b', 4b" and extend inn the same direction as the projecting pipe subs E1', E1". An interconnecting plate 7' extends in parallel with the back plate 4b', 4b" and spaced apart from these and connects two guide structures 6'.

The retrievable/replaceable module 1' will typically be a valve unit.

It is to be understood that when a module 1' is to be retrieved, the connector 3' firstly needs to be released. Then the hydraulic/mechanical tool 19 is used, now by pushing the structure 2' away from the module 1' along the guides 6' on the seabed unit 1". Then the module 1' can be retrieved along the posts P and along the wires W.

Figure 9:
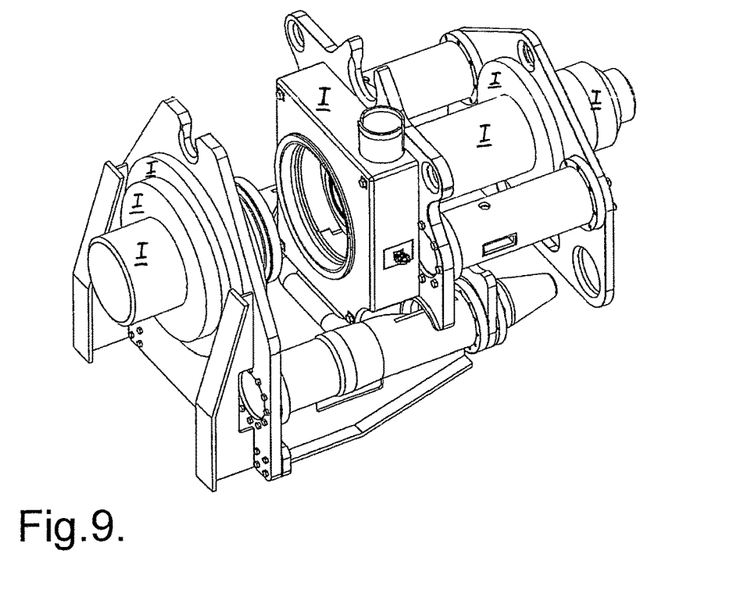
FIG. 9 shows in perspective view one embodiment where the load transferring subsea structure according to the invention is thermal insulated.

FIG. 9 shows a load transferring subsea structure where each pipe sub is thermal insulated from the surrounding medium. This is the same structure as is shown in FIG. 1A, and in the same perspective, but cladded with thermal insulation material. These portions are indicated with I. It is those parts where fluids are flowing that have insulation.

Figure 10:
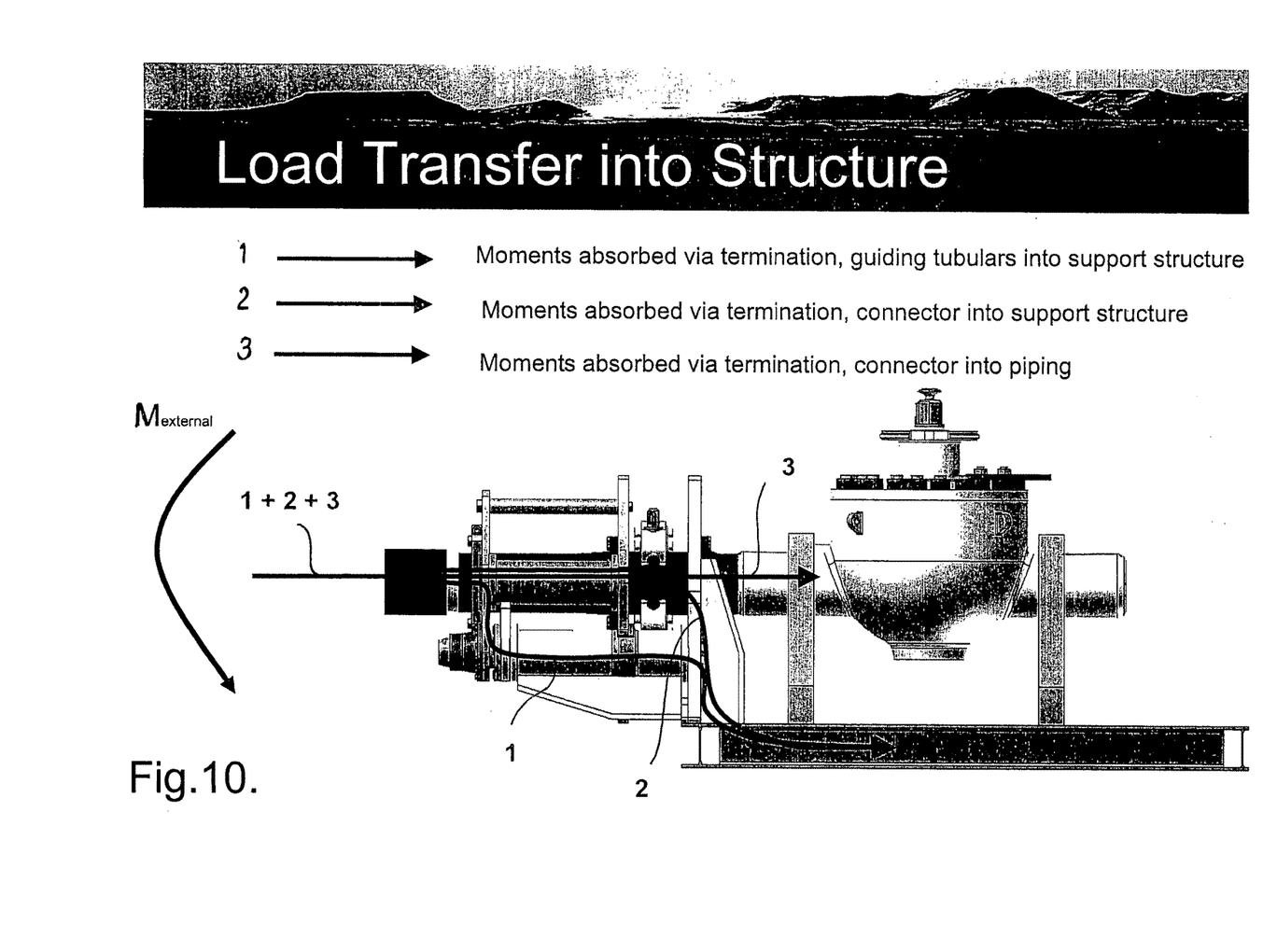
FIG. 10 shows the load transferring subsea structure where the three main paths for the transfer of forces through the structure are illustrated by arrows.

FIG. 10 shows the load transferring subsea structure where the three main routes for transfer of forces, or absorption of forces, through the structure are illustrated. Arrow 1 illustrates external moments that are absorbed via the load transferring subsea structure, i.e. the manoeuvrable structure 2', the guides 6' and the base frame F. Arrow 2 illustrates moments that are absorbed via the load transferring subsea structure, i.e. the manoeuvrable structure 2', the connector 3' and the base frame F. Arrow 3 illustrates moments that are absorbed via the load transferring subsea structure, i.e. the manoeuvrable structure 2', the connector 3' and in the further piping. This means that the connector 3' and the pipe ends themselves (such as E1' and E2') gain reduced loadings corresponding to that absorbed via the arrow route or path 1.

The invention claimed is:

1. A load transferring subsea structure for guiding and relieving forces within a pipe connection that is subjected to bending moments, the load transferring subsea structure comprising:
   a stationary structure that is adapted to retain a first pipe end and a maneuverable mobile structure that is adapted to retain a second pipe end;
   wherein the second pipe end is connectable to the first pipe end via a connector;
   wherein the stationary structure includes:
      a back plate that defines a plate plane, the back plate comprising a projecting pipe hub that is adapted to retain the first pipe end;
      two projecting guide structures that extend from the back plate in a direction that is substantially perpendicular to the plate plane;
      a connecting plate connected to the two projecting guide structures; and
      wherein each of the two projecting guide structures comprises a notch formed into a surface of each of the two projecting guide structures to facilitate coupling of the stationary structure with the maneuverable mobile structure, the notch being positioned between the back plate and the connecting plate;
   wherein the maneuverable mobile structure includes:
      a front plate part and a rear plate part that together are adapted to retain the second pipe end, the front and rear plate parts being substantially parallel, spaced apart from each other, and wherein the front plate part and the rear plate part are interconnected by bracing structures; and
      two projecting pipe subs that extend from the rear plate part and away from the front plate part, wherein the two projecting pipe subs interact with the two projecting guide structures during mating of the stationary structure and the maneuverable mobile structure to create a load path that removes at least some of a load from the pipe ends;
   wherein the front plate part of the maneuverable mobile structure includes a pair of horseshoe-shaped cut outs for interaction with the notches of the two projecting guide structures; and
   wherein, when the pair of horseshoe-shaped cut outs are positioned above the notches, the maneuverable mobile structure can be lowered onto the stationary structure so that an axis of each horseshoe-shaped cut out can be aligned with an axis of each of the two projecting guide structures.

2. The load transferring subsea structure according to claim 1, wherein the two projecting pipe subs and the two projecting guide structures are adapted to withstand a bending moment created during loading of the first and second pipe ends, and wherein each of the two projecting pipe subs and two projecting guide structures are spaced apart.

3. The load transferring subsea structure according to claim 2, wherein the two projecting guide structures include a front portion with a projecting pin extending from the connecting plate and a machined portion.

4. The load transferring subsea structure according to claim 3, wherein the projecting pins, during mating and subsequent to connection of the stationary structure and the maneuverable mobile structure, cooperate with the two projecting pipe subs of the maneuverable structure and the machined portion cooperates with the horseshoe-shaped cut out, the machined portion and the horseshoe-shaped cut out being made with tolerances relative to each other which withstand a bending moment caused by loading of the pipe ends.

5. The load transferring subsea structure according to claim 1, further comprising a catch/guide tool for temporary attachment to the stationary structure.

6. The load transferring subsea structure according to claim 1, wherein the maneuverable mobile structure includes swivel means that allows rotation of a pipeline relative to the maneuverable mobile structure about a longitudinal axis of the pipeline.

7. The load transferring subsea structure according to claim 1, wherein the load transferring subsea structure is divided into a retrievable/replaceable module having two opposite facing pipe ends and two cooperating base units, the module being designed to be placed between two maneuverable structures and landed on the two cooperating base units, wherein each of the two cooperating base units includes fitted surfaces for interaction with complementary fitted surfaces on the maneuverable mobile structure for creation of a load path external of the pipe ends, which load path provides withstands a bending moment during loads or strains within the pipe ends.

8. The load transferring subsea structure according to claim 7, wherein the retrievable/replaceable module includes back plates that define respective plate planes and that retains respective pipe ends, and wherein retention of the pipe ends forms projecting pipe subs.

9. The load transferring subsea structure according to claim 8, wherein each back plate is divided into an upper back plate on the module and a lower, aligned back plate arranged on each of the two cooperating base units and that together form the plate plane.

10. The load transferring subsea structure according to claim 8, wherein each of the two cooperating base units includes projecting guide structures extending substantially perpendicular to the back plate and extending in the same direction as the two projecting pipe subs, and a respective connecting plate extending substantially in parallel with the back plates and spaced apart from these and interconnects two guide structures.

11. The load transferring subsea structure according to claim 7, wherein the retrievable/replaceable module is a valve unit.

12. The load transferring subsea structure according to claim 1, wherein each pipe part that transports a medium is thermally insulated from a surrounding medium.

13. The load transferring subsea structure according to claim 1, further comprising a pair of saddles on the connecting plate upon which the bracing structures of the maneuverable structure can rest.

* * * * *